United States Patent
Li et al.

(10) Patent No.: US 11,804,130 B2
(45) Date of Patent: Oct. 31, 2023

(54) VEHICLE IDENTIFICATION METHOD AND APPARATUS, PRIMARY DEVICE, AND SECONDARY DEVICE

(71) Applicant: Alipay (Hangzhou) Information Technology Co., Ltd., Zhejiang (CN)

(72) Inventors: Fuxi Li, Zhejiang (CN); Wei Ye, Zhejiang (CN); Yuantao Sun, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/361,084

(22) Filed: Jun. 28, 2021

(65) Prior Publication Data
US 2022/0013004 A1   Jan. 13, 2022

(30) Foreign Application Priority Data
Jul. 8, 2020   (CN) .......................... 202010652284.8

(51) Int. Cl.
*H04W 4/80* (2018.01)
*G08G 1/017* (2006.01)
(Continued)

(52) U.S. Cl.
CPC .............. *G08G 1/017* (2013.01); *H04W 4/02* (2013.01); *H04W 4/40* (2018.02); *H04W 4/80* (2018.02); *G07B 15/063* (2013.01)

(58) Field of Classification Search
CPC .......... G08G 1/017; H04W 4/80; H04W 4/40; H04W 4/02; G07B 15/063
(Continued)

(56) References Cited

U.S. PATENT DOCUMENTS 4,325,146 A * 4/1982 Lennington ............ G08G 1/017
398/108
5,471,212 A * 11/1995 Sharpe .................... G01S 13/74
342/42
(Continued)

FOREIGN PATENT DOCUMENTS

| CN | 101150856 A | 3/2008 |
| CN | 107516422 A | 12/2017 |

(Continued)

*Primary Examiner* — Kerri L McNally
*Assistant Examiner* — Thang D Tran
(74) *Attorney, Agent, or Firm* — Seed IP Law Group LLP

(57) ABSTRACT

Implementations of the present specification provide a vehicle identification method and apparatus, a primary device, and a secondary device. In the vehicle identification method, after sending a low-frequency signal, the primary device receives a response signal sent by the secondary device for the low-frequency signal, and communicates with the secondary device to obtain identity information of a vehicle on which the secondary device is located, so that the vehicle can be identified. The response signal is sent from the secondary device after the secondary device receives the low-frequency signal and detects that the signal strength of the low-frequency signal is greater than or equal to a predetermined threshold, and the signal strength of the low-frequency signal rapidly attenuates as the distance increases, so that the primary device can determine the location of the vehicle on which the secondary device is located solely based on the received response signal.

20 Claims, 10 Drawing Sheets

(51) Int. Cl.
*H04W 4/40* (2018.01)
*H04W 4/02* (2018.01)
*G07B 15/06* (2011.01)

(58) Field of Classification Search
USPC .................................................... 340/933
See application file for complete search history.

(56) References Cited

U.S. PATENT DOCUMENTS

| | | | | |
|---|---|---|---|---|
| 5,809,142 | A * | 9/1998 | Hurta | G06Q 20/3676 340/928 |
| 6,339,384 | B1 * | 1/2002 | Valdes-Rodriguez | G07B 15/063 235/384 |
| 8,543,285 | B2 * | 9/2013 | Allen | G08G 1/017 705/13 |
| 8,587,454 | B1 * | 11/2013 | Dearworth | G07B 15/063 340/928 |
| 10,299,081 | B1 * | 5/2019 | Tyagi | H04W 4/029 |
| 11,164,017 | B2 * | 11/2021 | Vossoughi | G08G 1/146 |
| 2005/0226201 | A1 * | 10/2005 | McMillin | H04W 88/04 370/348 |
| 2006/0015233 | A1 * | 1/2006 | Olsen, III | G07C 9/28 701/2 |
| 2007/0200669 | A1 * | 8/2007 | McBride | B60R 25/245 340/5.72 |
| 2007/0200672 | A1 * | 8/2007 | McBride | B60R 25/245 340/5.72 |
| 2007/0285237 | A1 * | 12/2007 | Batra | G06K 19/0716 340/572.1 |
| 2007/0290802 | A1 * | 12/2007 | Batra | G06K 7/0008 340/10.1 |
| 2008/0221761 | A1 * | 9/2008 | Shimoda | H04W 8/005 701/1 |
| 2009/0140887 | A1 * | 6/2009 | Breed | G01S 13/867 340/990 |
| 2009/0191922 | A1 * | 7/2009 | Rokusek | H04M 1/6075 455/41.2 |
| 2010/0127820 | A1 * | 5/2010 | Froitzheim | G06K 19/0723 340/5.2 |
| 2010/0203834 | A1 * | 8/2010 | Bragagnini | G08G 1/017 455/41.2 |
| 2010/0289623 | A1 * | 11/2010 | Roesner | G06K 7/10435 340/10.3 |
| 2011/0163857 | A1 * | 7/2011 | August | G06K 19/0723 340/10.42 |
| 2013/0099943 | A1 * | 4/2013 | Subramanya | B60Q 9/002 340/933 |
| 2013/0185001 | A1 * | 7/2013 | Cardoso | G01M 15/102 702/24 |
| 2013/0231760 | A1 * | 9/2013 | Rosen | A63F 13/816 700/91 |
| 2014/0049420 | A1 * | 2/2014 | Lehning | G01S 13/91 342/109 |
| 2014/0074667 | A1 * | 3/2014 | Smith | G01S 13/74 705/28 |
| 2014/0240088 | A1 * | 8/2014 | Robinette | G06K 19/0711 340/5.61 |
| 2014/0240091 | A1 * | 8/2014 | Talty | B60R 25/245 340/5.62 |
| 2015/0070191 | A1 * | 3/2015 | Westick | H04Q 9/00 340/870.07 |
| 2015/0221140 | A1 * | 8/2015 | Eid | G08G 1/017 705/13 |
| 2015/0248801 | A1 * | 9/2015 | Froitzheim | B60R 25/406 340/5.61 |
| 2015/0350748 | A1 * | 12/2015 | Abuelsaad | H04Q 9/00 340/870.07 |
| 2015/0356498 | A1 * | 12/2015 | Casanova | G07B 15/02 705/13 |
| 2015/0382155 | A1 * | 12/2015 | Ulliman | H04W 4/021 455/456.1 |
| 2016/0226149 | A1 * | 8/2016 | Huang | H01Q 5/25 |
| 2016/0358396 | A1 * | 12/2016 | Spiess | H04B 5/0031 |
| 2017/0026910 | A1 * | 1/2017 | Scheim | H04W 52/0245 |
| 2017/0048680 | A1 * | 2/2017 | Chuang | H04W 4/80 |
| 2017/0064627 | A1 * | 3/2017 | Debates | H04W 4/80 |
| 2017/0249635 | A1 * | 8/2017 | Baur | G06Q 20/3278 |
| 2018/0038935 | A1 * | 2/2018 | Iizuka | G01S 5/06 |
| 2018/0075287 | A1 * | 3/2018 | Elswick | H04B 10/1123 |
| 2018/0276925 | A1 * | 9/2018 | Hayashi | H04Q 9/00 |
| 2018/0302859 | A1 * | 10/2018 | Elangovan | B60R 25/24 |
| 2019/0035168 | A1 * | 1/2019 | Yamaguchi | G08G 1/017 |
| 2019/0057557 | A1 * | 2/2019 | Wang | G08G 1/0175 |
| 2019/0065951 | A1 * | 2/2019 | Luo | G08G 1/0112 |
| 2019/0084359 | A1 * | 3/2019 | Hassani | H04W 4/80 |
| 2019/0084383 | A1 * | 3/2019 | Sinaguinan | B32B 17/10504 |
| 2019/0297457 | A1 | 9/2019 | Ledvina et al. | |
| 2019/0351870 | A1 * | 11/2019 | Fricke | B60R 25/245 |
| 2020/0250896 | A1 * | 8/2020 | Vossoughi | G07B 15/04 |
| 2020/0294401 | A1 * | 9/2020 | Kerecsen | G08G 1/096725 |
| 2020/0349783 | A1 * | 11/2020 | Kelly | H04B 17/318 |
| 2021/0081687 | A1 * | 3/2021 | Yamamoto | B60R 1/00 |
| 2021/0142599 | A1 * | 5/2021 | Kawamura | B60R 25/24 |
| 2021/0150836 | A1 * | 5/2021 | Fricke | B60R 25/245 |
| 2022/0024412 | A1 * | 1/2022 | Kelly | G01S 5/0284 |
| 2022/0050192 | A1 * | 2/2022 | Godet | B60R 25/24 |

FOREIGN PATENT DOCUMENTS

| | | |
|---|---|---|
| CN | 108961836 A | 12/2018 |
| CN | 109862522 A | 6/2019 |

* cited by examiner

VEHICLE IDENTIFICATION METHOD AND APPARATUS, PRIMARY DEVICE, AND SECONDARY DEVICE

BACKGROUND

Technical Field

Implementations of the present specification relate to the field of Internet technologies, and in particular, to a vehicle identification method and apparatus, a primary device, and a secondary device.

Description of the Related Art

Currently, vehicle identities are generally automatically identified by using solutions such as electronic toll collection (ETC), vehicle license plate identification, or Bluetooth cards. For example, the ETC identifies a vehicle (e.g., through a vehicle license plate number), through microwave dedicated short-range communication between an in-vehicle electronic label installed on a vehicle windshield and a microwave antenna on an ETC lane of a toll station.

BRIEF SUMMARY

Implementations of the present specification provide a vehicle identification method and apparatus, a primary device, and a secondary device, which improves the accuracy of vehicle identification and the accuracy of detecting the location of a vehicle.

According to a first aspect, the implementations of the present specification provide a vehicle identification method, including: sending, by a primary device, a low-frequency signal with a predetermined radiation range; receiving a response signal sent by a secondary device located on a vehicle responding to the low-frequency signal, the response signal being sent by the secondary device in response to the secondary device receiving the low-frequency signal and detecting that signal strength of the low-frequency signal is greater than or equal to a predetermined threshold; and communicating with the secondary device to obtain identity information of the vehicle on which the secondary device is located.

In the vehicle identification method, after sending the low-frequency signal, the primary device receives the response signal sent by the secondary device responding to the low-frequency signal, and communicates with the secondary device to obtain the identity information of the vehicle on which the secondary device is located, so that the vehicle can be identified. The response signal is sent by the secondary device in response to the secondary device receiving the low-frequency signal and detecting that the signal strength of the low-frequency signal is greater than or equal to the predetermined threshold, and the signal strength of the low-frequency signal rapidly attenuates as the distance increases, so that the primary device can determine the location of the vehicle on which the secondary device is located solely based on the received response signal. Therefore, the vehicle on which the secondary device is located can be positioned accurately, thereby alleviating interference from vehicles following and bypassing the vehicle to be identified and improving the accuracy of vehicle identification.

In an implementation, the method further includes: before the communicating with the secondary device to obtain the identity information of the vehicle on which the secondary device is located, determining that the secondary device falls within the radiation range of the low-frequency signal based on the response signal, and determining that the vehicle on which the secondary device is located is a vehicle to be identified.

In an implementation, the communicating with the secondary device to obtain the identity information of the vehicle on which the secondary device is located includes: communicating with the secondary device to receive the identity information of the vehicle on which the secondary device is located that is sent by the secondary device; or communicating with the secondary device to receive an identifier of the secondary device that is sent by the secondary device, and obtain the identity information of the vehicle on which the secondary device is located based on the identifier of the secondary device.

According to a second aspect, the implementations of the present specification provide a vehicle identification method, including: receiving, by a secondary device, a low-frequency signal sent by a primary device; detecting signal strength of the low-frequency signal; sending a response signal to the primary device in response to the signal strength of the low-frequency signal being greater than or equal to a predetermined threshold; and communicating with the primary device to cause the primary device to obtain identity information of a vehicle on which the secondary device is located.

In the vehicle identification method, after receiving the low-frequency signal sent by the primary device, the secondary device detects the signal strength of the low-frequency signal. In response to the signal strength of the low-frequency signal being greater than or equal to the predetermined threshold, the secondary device sends the response signal to the primary device, and communicates with the primary device to cause the primary device to obtain the identity information of the vehicle on which the secondary device is located, so that the primary device can accurately position the vehicle on which the secondary device is located, thereby alleviating interference from vehicles following and bypassing the vehicle to be identified and improving the accuracy of vehicle identification.

According to a third aspect, the implementations of the present specification provide a vehicle identification method, including: sending, by a primary device located on a vehicle, a low-frequency signal with a predetermined radiation range; receiving a response signal sent by a secondary device responding to the low-frequency signal, the response signal being sent by the secondary device in response to the secondary device receiving the low-frequency signal and detecting that signal strength of the low-frequency signal is greater than or equal to a predetermined threshold; and communicating with the secondary device to cause the secondary device to obtain identity information of the vehicle on which the primary device is located.

In the vehicle identification method, after sending the low-frequency signal, the primary device receives the response signal sent by the secondary device responding to the low-frequency signal, and communicates with the secondary device to cause the secondary device to obtain the identity information of the vehicle on which the primary device is located, so that the vehicle can be identified. The response signal is sent by the secondary device in response to the secondary device receiving the low-frequency signal and detecting that the signal strength of the low-frequency signal is greater than or equal to the predetermined threshold, and the signal strength of the low-frequency signal rapidly attenuates as the distance increases, so that the primary device can determine the distance between the secondary device and the vehicle on which the primary device is located solely based on the received response signal. Therefore, the vehicle on which the primary device is located can be positioned accurately, thereby alleviating interference from vehicles following and bypassing the vehicle to be identified and improving the accuracy of vehicle identification.

In an implementation, the method further includes: before the communicating with the secondary device to cause the secondary device to obtain the identity information of the vehicle on which the primary device is located, determining that the secondary device falls within the radiation range of the low-frequency signal based on the response signal, and determining that the vehicle on which the primary device is located is a vehicle to be identified.

In an implementation, the communicating with the secondary device to cause the secondary device to obtain the identity information of the vehicle on which the primary device is located includes: communicating with the secondary device to send the identity information of the vehicle on which the primary device is located to the secondary device; or communicating with the secondary device to send an identifier of the primary device to the secondary device, to cause the secondary device to obtain the identity information of the vehicle on which the primary device is located based on the identifier of the primary device.

According to a fourth aspect, the implementations of the present specification provide a vehicle identification apparatus, including: a sending module, configured to send a low-frequency signal with a predetermined radiation range; a receiving module, configured to receive a response signal sent by a secondary device located on a vehicle responding to the low-frequency signal, the response signal being sent by the secondary device in response to the secondary device receiving the low-frequency signal and detecting that signal strength of the low-frequency signal is greater than or equal to a predetermined threshold; and an acquisition module, configured to communicate with the secondary device to obtain identity information of a vehicle on which the secondary device is located.

In an implementation, the apparatus further includes: a determining module, configured to: before the acquisition module obtains the identity information of the vehicle on which the secondary device is located, determine whether the secondary device falls within the radiation range of the low-frequency signal based on the response signal, and determine whether the vehicle on which the secondary device is located is a vehicle to be identified.

In an implementation, the acquisition module is configured to communicate with the secondary device to receive the identity information of the vehicle on which the secondary device is located that is sent by the secondary device; or communicate with the secondary device to receive an identifier of the secondary device that is sent by the secondary device, and obtain the identity information of the vehicle on which the secondary device is located based on the identifier of the secondary device.

According to a fifth aspect, the implementations of the present specification provide a vehicle identification apparatus, including: a receiving module, configured to receive a low-frequency signal sent by a primary device; a detection module, configured to detect signal strength of the low-frequency signal; a sending module, configured to send a response signal to the primary device in response to the signal strength of the low-frequency signal being greater than or equal to a predetermined threshold; and a communication module, configured to communicate with the primary device to cause the primary device to obtain identity information of a vehicle on which the secondary device is located.

According to a sixth aspect, the implementations of the present specification provide a vehicle identification apparatus, including: a sending module, configured to send a low-frequency signal with a predetermined radiation range; a receiving module, configured to receive a response signal sent by a secondary device responding to the low-frequency signal, the response signal being sent by the secondary device in response to the secondary device receiving the low-frequency signal and detecting that signal strength of the low-frequency signal is greater than or equal to a predetermined threshold; and a communication module, configured to communicate with the secondary device to cause the secondary device to obtain identity information of a vehicle on which a primary device is located.

In an implementation, the apparatus further includes: a determining module, configured to, before the communication module communicates with the secondary device, determine whether the secondary device falls within the radiation range of the low-frequency signal based on the response signal, and determine whether the vehicle on which the primary device is located is a vehicle to be identified.

In an implementation, the communication module is configured to communicate with the secondary device to send the identity information of the vehicle on which the primary device is located to the secondary device; or communicate with the secondary device to send an identifier of the primary device to the secondary device, to cause the secondary device to obtain the identity information of the vehicle on which the primary device is located based on the identifier of the primary device.

According to a seventh aspect, the implementations of the present specification provide a primary device, including: at least one processor; and at least one memory communicatively connected to the processor. The memory stores program instructions executable by the processor, and invocable by the processor to perform the method provided in the first aspect.

According to an eighth aspect, the implementations of the present specification provide a non-transient computer-readable storage medium. The non-transient computer-readable storage medium stores computer instructions, and the computer instructions cause the computer to perform the method provided in the first aspect.

According to a ninth aspect, the implementations of the present specification provide a secondary device, including: at least one processor; and at least one memory communicatively connected to the processor. The memory stores program instructions executable by the processor, and invocable by the processor to perform the method provided in the second aspect.

According to a tenth aspect, the implementations of the present specification provide a non-transient computer-readable storage medium. The non-transient computer-readable storage medium stores computer instructions, and the computer instructions cause the computer to perform the method provided in the second aspect.

According to an eleventh aspect, the implementations of the present specification provide a primary device, including: at least one processor; and at least one memory communicatively connected to the processor. The memory stores program instructions executable by the processor, and invocable by the processor to perform the method provided in the third aspect.

According to a twelfth aspect, the implementations of the present specification provide a non-transient computer-readable storage medium. The non-transient computer-readable storage medium stores computer instructions, and the computer instructions cause the computer to perform the method provided in the third aspect.

It should be understood that the fourth, seventh, and eighth aspects of the implementations of the present specification are consistent with the technical solutions of the first aspect of the implementations of the present specification, and beneficial effects obtained by all the aspects and corresponding feasible implementations are similar. Details are omitted for simplicity.

BRIEF DESCRIPTION OF THE SEVERAL VIEWS OF THE DRAWINGS

To describe the technical solutions in the implementations of the present specification more clearly, the following briefly describes the accompanying drawings needed for describing the implementations. Clearly, the accompanying drawings in the following description show merely some implementations of the present specification, and a person of ordinary skill in the art can still derive other drawings from these accompanying drawings without creative efforts.

DETAILED DESCRIPTION

To make the technical solutions in the present specification more comprehensible, the following describes the implementations of the present specification in detail with reference to the accompanying drawings.

It should be clear that the described implementations are merely some rather than all of the implementations of the present specification. All other implementations obtained by a person of ordinary skill in the art based on the implementations of the present specification without creative efforts shall fall within the protection scope of the present specification.

The terms used in the implementations of the present specification are merely used to describe example implementations, and are not intended to limit the present specification. The singular forms "a", "the", and "this" used in the implementations and the appended claims of the present specification are also intended to include plural forms, unless otherwise specified in the context clearly.

In existing technologies, vehicles are mostly automatically identified using solutions such as ETC, vehicle license plate identification, or Bluetooth cards. These solutions have their respective disadvantages, such as high costs, poor generality, and vulnerability to interference or high misidentification rates.

Therefore, the implementations of the present specification provide a vehicle identification method, which can improve the accuracy of vehicle identification and the accuracy of detecting the location of a vehicle as well as having relatively high generality.

Figure 1:
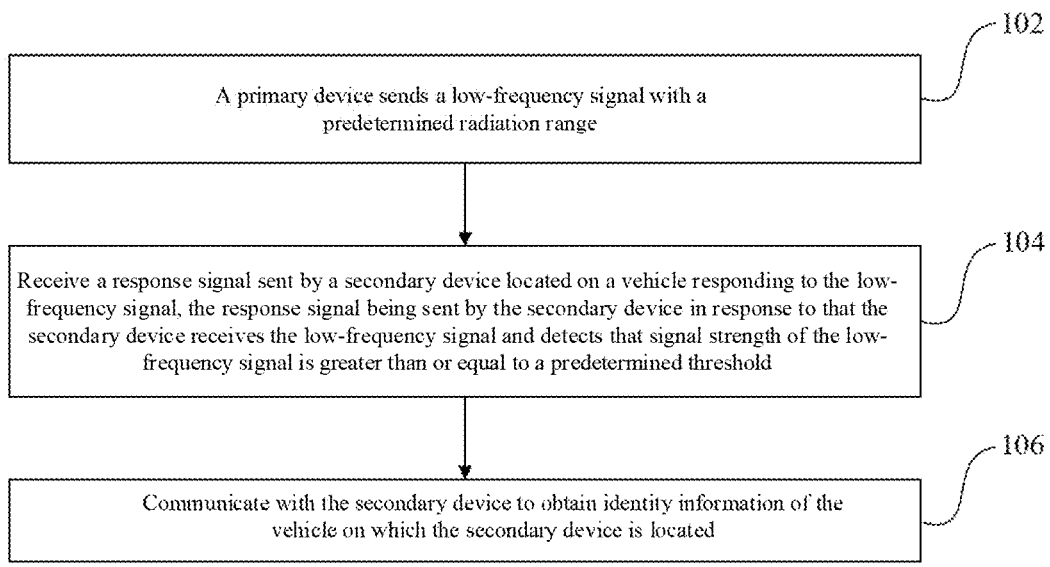
FIG. 1 is a flowchart illustrating an implementation of a vehicle identification method according to the present specification.

FIG. 1 is a flowchart illustrating an implementation of a vehicle identification method according to the present specification. As shown in FIG. 1, the vehicle identification method can include the following steps.

Step 102: A primary device sends a low-frequency signal with a predetermined radiation range.

In some implementations, the primary device is a device that actively sends the low-frequency signal and corresponds to a secondary device. The secondary device is usually in a sleep state, and makes a response after receiving the low-frequency signal sent by the primary device.

The magnetic field signal dominates in a low-frequency signal, and the radiation range of the low-frequency signal is easy to control, a radius is usually 3 meters. The primary device can communicate with the secondary device by controlling the radiation range of the low-frequency signal sent by the primary device. For example, only a secondary device within the radiation range can receive the low-frequency signal, while a secondary device outside the radiation range cannot receive the low-frequency signal or can only receive a low-frequency signal with very weak signal strength.

Figure 2:
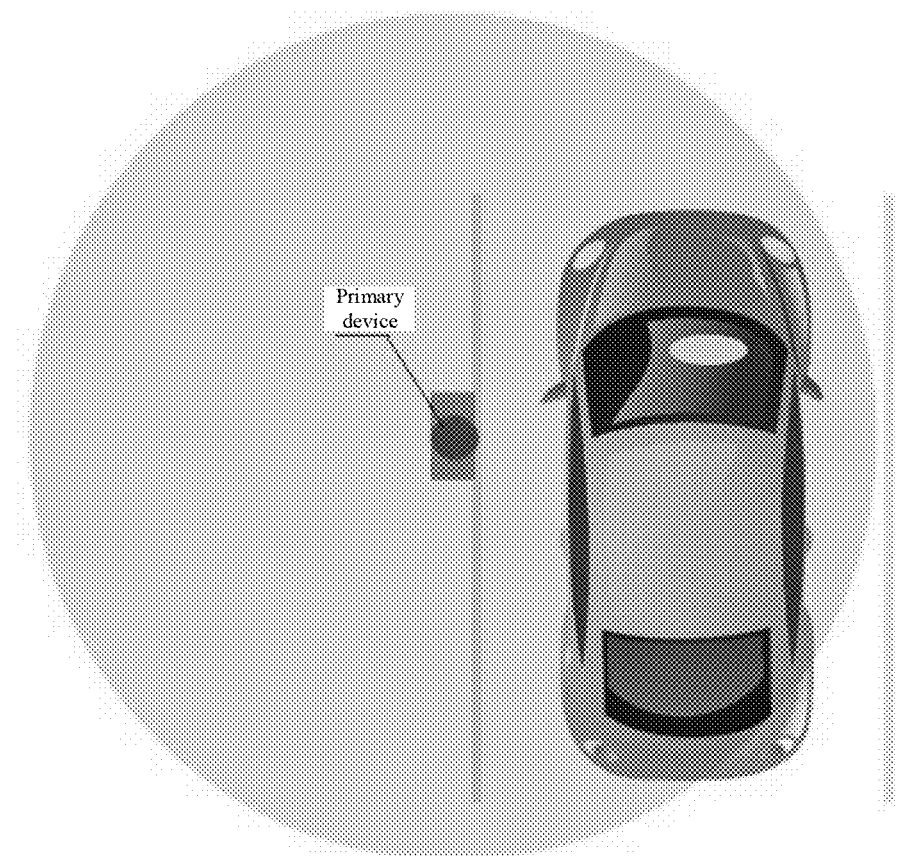
FIG. 2 is a schematic diagram illustrating installation locations of a primary device and a secondary device according to an implementation of the present specification.

The radiation range of the low-frequency signal can include a radiation angle and a radiation radius of the low-frequency signal. In this implementation, the primary device can be installed at a certain fixed location on a roadside, as shown in FIG. 2. In this case, the secondary device can be installed on a vehicle. Therefore, in some implementations, the radiation angle and the radiation radius of the low-frequency signal can be determined based on the location of the primary device relative to a lane that needs to be detected, the width of the lane, and/or the length of the vehicle, etc., so that only a secondary device included in a vehicle travelling in the lane that needs to be detected by the primary device can receive the low-frequency signal. The radiation range can be predetermined or dynamically determined. The radiation range can be determined with different values for different scenarios or use environments. For example, the radiation range can be pre-determined with different values of radiation angle and radiation radius for different use environments. In the description herein, the radiation range being predetermined is used as an illustrative example, which does not limit the scope of the disclosure. FIG. 2 is a schematic diagram illustrating installation locations of a primary device and a secondary device according to an implementation of the present specification.

Step 104: Receive a response signal sent by the secondary device located on a vehicle responding to the low-frequency signal, the response signal being sent by the secondary device in response to the secondary device receiving the low-frequency signal and detecting that signal strength of the low-frequency signal is greater than or equal to a determined threshold.

For example, in some implementations, the determined threshold can be self-determined based on an implementation requirement, system performance, etc. The predetermined threshold is not limited in this implementation. The determined threshold can be predetermined or dynamically determined and can be determined with different values for different use environment and scenarios.

The secondary device being located on the vehicle includes the scenarios that the secondary device is integrated in the vehicle as an integral part of the vehicle, coupled electrically and/or mechanically to the vehicle, or carried on the vehicle, or any other scenarios that the secondary device is located on the vehicle.

As the distance increases, the signal strength of the low-frequency signal, e.g., the magnetic field signal, rapidly attenuates, and can approach 0 outside 3 m. Therefore, after the radiation range of the low-frequency signal is predetermined, the secondary device is "woken up" from the sleep state only when the vehicle on which the secondary device is located enters or is within the radiation range. When detecting that the signal strength of the low-frequency signal is greater than or equal to the predetermined threshold, the secondary device determines that the secondary device falls within the radiation range of the low-frequency signal. In this case, the secondary device sends the response signal to the primary device, so that the primary device can determine that the distance between the vehicle on which the secondary device is located and the primary device is less than the radiation radius of the low-frequency signal solely based on the received response signal. Therefore, the location of the vehicle on which the secondary device is located can be determined accurately.

In some implementation, the signal strength is configured to attenuate or decrease based on the determined radiation range. For example, the signal strength decreases to a level that is below the determined threshold at an edge of the radiation range. In some implementations, the determined threshold is determined based on the determined radiation range. In some implementations, the determined threshold is determined based on the signal strength of the low-frequency signal at the edge of the determined radiation range. For example, the determined threshold is equal to a signal strength at the edge of the radiation range.

Step 106: Communicate with the secondary device to obtain identity information of the vehicle on which the secondary device is located.

In this implementation, the identity information of the vehicle can include one or a combination of a vehicle license plate number, an engine number, and a frame number. Certainly, the identity information of the vehicle can further include other information that can uniquely identify the vehicle. Specific information included in the identity information of the vehicle is not limited in this implementation.

For example, the communicating with the secondary device to obtain the identity information of the vehicle on which the secondary device is located can be: communicating with the secondary device to receive the identity information of the vehicle on which the secondary device is located that is sent by the secondary device; or communicating with the secondary device to receive an identifier of the secondary device that is sent by the secondary device, and obtain the identity information of the vehicle on which the secondary device is located based on the identifier of the secondary device.

That is, in an implementation, the identity information of the vehicle can be pre-stored in the secondary device. In a process in which the primary device communicates with the secondary device, the secondary device can directly send the identity information of the vehicle on which the secondary device is located to the primary device, and the primary device receives the identity information of the vehicle that is sent by the secondary device.

In an implementation, when the secondary device is used for the first time, a user can submit the identifier of the secondary device and the identity information of the vehicle on which the secondary device is located to a server. In a process in which the primary device communicates with the secondary device, the secondary device only needs to send the identifier of the secondary device to the primary device, and the primary device receives the identifier of the secondary device and then obtains the identity information of the vehicle on which the secondary device is located from the server based on the identifier of the secondary device.

Further, after obtaining the identity information of the vehicle, the primary device can communicate with the server to send the identity information of the vehicle to the server, so that the server can obtain a user account associated with the identity information of the vehicle and then perform an operation such as deducting a fare from the user account, and/or pushing a message to the user account.

In the vehicle identification method, after sending the low-frequency signal, the primary device receives the response signal sent by the secondary device responding to the low-frequency signal, and communicates with the secondary device to obtain the identity information of the vehicle on which the secondary device is located, so that the vehicle can be identified. The response signal is sent by the secondary device in response to the secondary device receiving the low-frequency signal and detecting that the signal strength of the low-frequency signal is greater than or equal to the predetermined threshold, and the signal strength of the low-frequency signal rapidly attenuates as the distance increases, so that the primary device can determine the location of the vehicle on which the secondary device is located solely based on the received response signal. Therefore, the location of the vehicle on which the secondary device is located can be determined accurately, thereby alleviating interference from vehicles following and bypassing the vehicle to be identified and improving the accuracy of vehicle identification.

Figure 3:
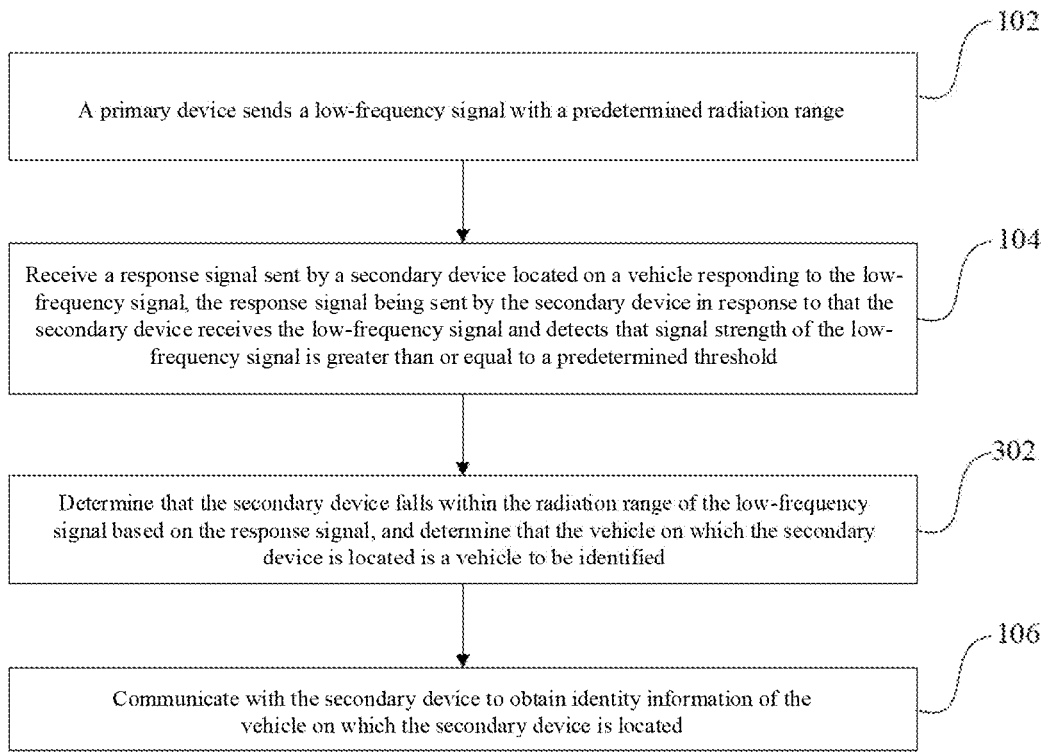
FIG. 3 is a flowchart illustrating another implementation of a vehicle identification method according to the present specification.

FIG. 3 is a flowchart illustrating another implementation of a vehicle identification method according to the present specification. As shown in FIG. 3, before step 106, the method can further include the following step.

Step 302: Determine that the secondary device falls within the radiation range of the low-frequency signal based on the response signal, and determine that the vehicle on which the secondary device is located is a vehicle to be identified.

In this implementation, because the radiation range of the low-frequency signal can include the radiation angle and the radiation radius of the low-frequency signal, that the secondary device falls within the radiation range of the low-frequency signal can be that the distance between the secondary device and the primary device is less than or equal to the radiation radius of the low-frequency signal.

For example, when detecting that the signal strength of the low-frequency signal is greater than or equal to the predetermined threshold, the secondary device determines that the secondary device falls within the radiation range of the low-frequency signal, that is, the distance between the secondary device and the primary device is less than or equal to the radiation radius of the low-frequency signal. In this case, the secondary device sends the response signal to the primary device, so that the primary device can determine that the secondary device falls within the radiation range of the low-frequency signal solely based on the received response signal and then can determine that the vehicle on which the secondary device is located is located within the radiation range of the low-frequency signal. It can be understood that because the radiation range of the low-frequency signal is determined based on the location of the primary device relative to the lane that needs to be detected, the width of the lane, and/or the length of the vehicle, etc., the primary device can determine that the vehicle within the radiation range of the low-frequency signal is the vehicle to be identified, so that the location of the vehicle on which the secondary device is located can be determined accurately, thereby alleviating interference from vehicles following and bypassing the vehicle to be identified and improving the accuracy of vehicle identification.

Figure 4:
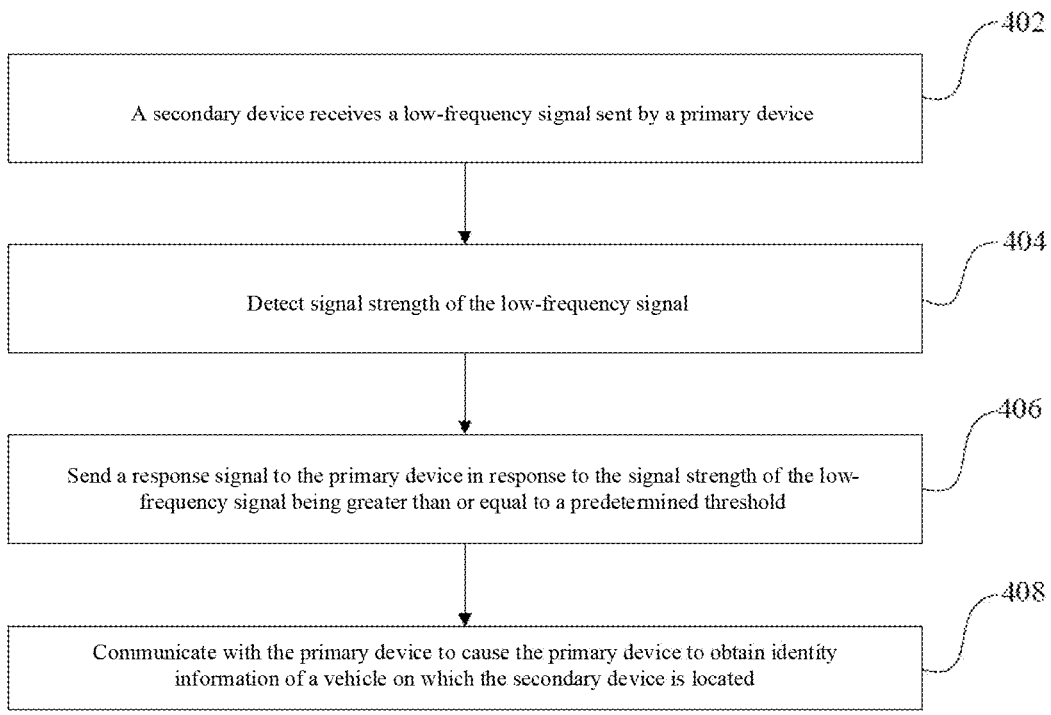
FIG. 4 is a flowchart illustrating another implementation of a vehicle identification method according to the present specification.

FIG. 4 is a flowchart illustrating another implementation of a vehicle identification method according to the present specification. As shown in FIG. 4, the vehicle identification method can include the following steps.

Step 402: A secondary device receives a low-frequency signal sent by a primary device.

The primary device is a device that actively sends the low-frequency signal and corresponds to the secondary device. The secondary device is usually in a sleep state. In this implementation, the primary device can be installed at a certain fixed location on a roadside, as shown in FIG. 2. A radiation range of the low-frequency signal sent by the primary device is predetermined. The secondary device can be installed on a vehicle, and the secondary device can receive the low-frequency signal sent by the primary device after entering the radiation range of the low-frequency signal.

Step 404: Detect signal strength of the low-frequency signal.

Step 406: Send a response signal to the primary device in response to the signal strength of the low-frequency signal being greater than or equal to a predetermined threshold.

During specific implementation, the predetermined threshold can be self-determined based on an implementation requirement, system performance, etc. The predetermined threshold is not limited in this implementation.

For example, after receiving the low-frequency signal, the secondary device detects the signal strength of the low-frequency signal. In response to the signal strength of the low-frequency signal being greater than or equal to the predetermined threshold, the secondary device determines that the secondary device falls within the radiation range of the low-frequency signal. In this case, the secondary device sends the response signal to the primary device, so that the primary device can determine the location of the vehicle on which the secondary device is located solely based on the received response signal. Therefore, the vehicle on which the secondary device is located can be positioned accurately.

Step 408: Communicate with the primary device to cause the primary device to obtain identity information of the vehicle on which the secondary device is located.

In this implementation, the identity information of the vehicle can include one or a combination of a vehicle license plate number, an engine number, and a frame number. Certainly, the identity information of the vehicle can further include other information that can uniquely identify the vehicle. Specific information included in the identity information of the vehicle is not limited in this implementation.

In some implementations, the communicating with the primary device to cause the primary device to obtain the identity information of the vehicle on which the secondary device is located can be: communicating with the primary device to send the identity information of the vehicle on which the secondary device is located to the primary device; or communicating with the primary device to send an identifier of the secondary device to the primary device, to cause the primary device to obtain the identity information of the vehicle on which the secondary device is located based on the identifier of the secondary device.

In the vehicle identification method, after receiving the low-frequency signal sent by the primary device, the secondary device detects the signal strength of the low-frequency signal. In response to the signal strength of the low-frequency signal being greater than or equal to the predetermined threshold, the secondary device sends the response signal to the primary device, and communicates with the primary device to cause the primary device to obtain the identity information of the vehicle on which the secondary device is located, so that the primary device can accurately determine the location of the vehicle on which the secondary device is located, thereby alleviating interference from vehicles following and bypassing the vehicle to be identified and improving the accuracy of vehicle identification.

Figure 5:
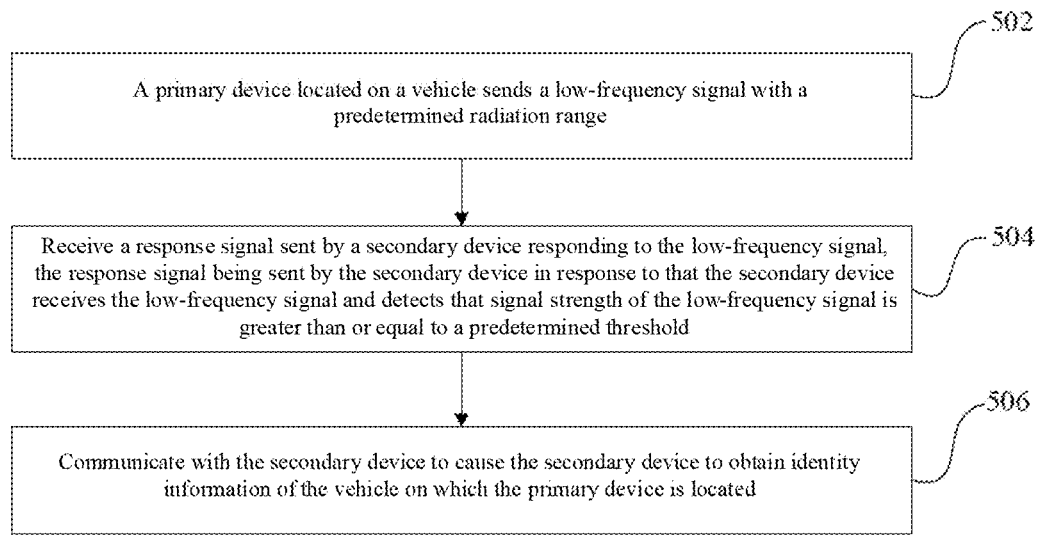
FIG. 5 is a flowchart illustrating another implementation of a vehicle identification method according to the present specification.

FIG. 5 is a flowchart illustrating another implementation of a vehicle identification method according to the present specification. As shown in FIG. 5, the vehicle identification method can include the following steps.

Step 502: A primary device located on a vehicle sends a low-frequency signal with a predetermined radiation range.

Figure 6:
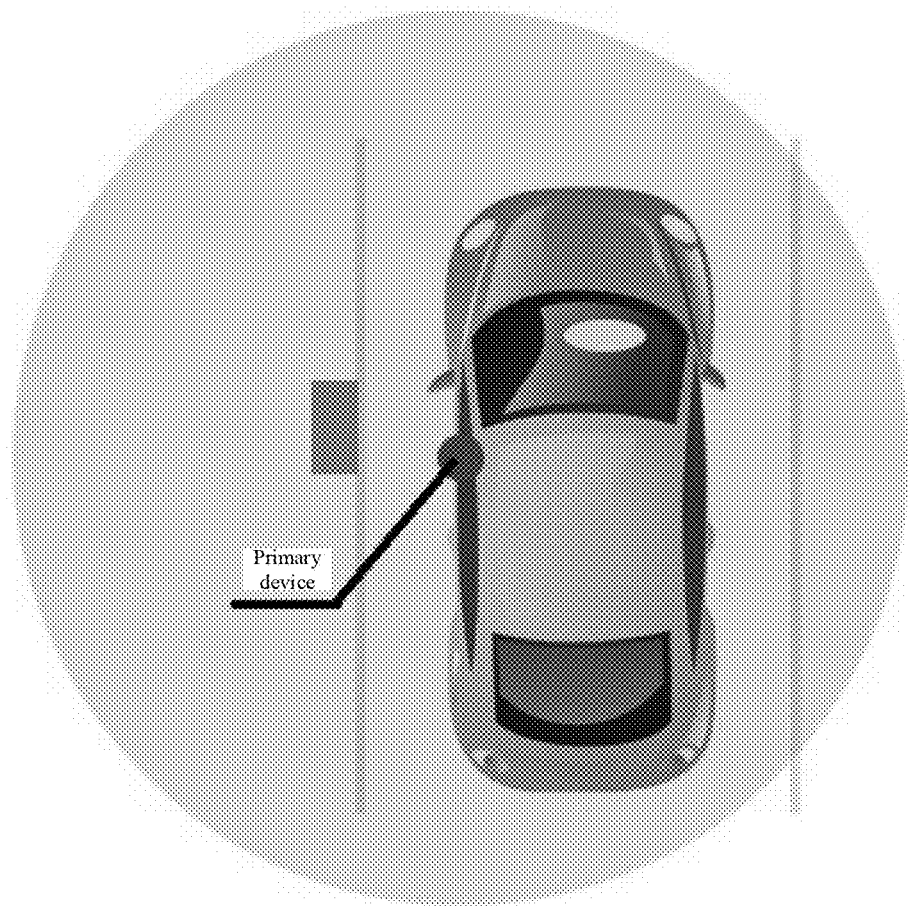
FIG. 6 is a schematic diagram illustrating installation locations of a primary device and a secondary device according to another implementation of the present specification.

For example, the radiation range of the low-frequency signal can include a radiation angle and a radiation radius of the low-frequency signal. In this implementation, the primary device can be installed on a vehicle, and the secondary device can be installed at a certain fixed location on a roadside, as shown in FIG. 6. Therefore, in some implementations, the radiation angle and the radiation radius of the low-frequency signal can be determined based on the installation location of the secondary device, so that the radiation range of the low-frequency signal sent by the primary device can cover the secondary device when the vehicle in which the primary device is installed travels on a road on which the secondary device is installed. FIG. 6 is a schematic diagram illustrating installation locations of a primary device and a secondary device according to another implementation of the present specification.

Step 504: Receive a response signal sent by the secondary device responding to the low-frequency signal, the response signal being sent by the secondary device in response to the secondary device receiving the low-frequency signal and detecting that signal strength of the low-frequency signal is greater than or equal to a predetermined threshold.

For example, in some implementations, the predetermined threshold can be self-determined based on an implementation requirement, system performance, etc. The predetermined threshold is not limited in this implementation.

As the distance increases, the signal strength of the low-frequency signal, e.g., a magnetic field signal, rapidly attenuates, and can approach 0 outside 3 m. Therefore, after the radiation range of the low-frequency signal is determined, the secondary device is "woken up" from a sleep state only when the secondary device enters the radiation range of the low-frequency signal. When detecting that the signal strength of the low-frequency signal is greater than or equal to the predetermined threshold, the secondary device determines that the secondary device falls within the radiation range of the low-frequency signal. In this case, the secondary device sends the response signal to the primary device, so that the primary device can determine that the distance between the vehicle on which the primary device is located and the secondary device is less than or equal to the radiation radius of the low-frequency signal solely based on the received response signal.

Step 506: Communicate with the secondary device to cause the secondary device to obtain identity information of the vehicle on which the primary device is located.

For example, the communicating with the secondary device to cause the secondary device to obtain the identity information of the vehicle on which the primary device is located can be: communicating with the secondary device to send the identity information of the vehicle on which the primary device is located to the secondary device; or communicating with the secondary device to send an identifier of the primary device to the secondary device, to cause the secondary device to obtain the identity information of the vehicle on which the primary device is located based on the identifier of the primary device.

That is, in an implementation, the identity information of the vehicle can be pre-stored in the primary device. In a process in which the primary device communicates with the secondary device, the primary device can directly send the identity information of the vehicle on which the primary device is located to the secondary device, and the secondary device receives the identity information of the vehicle that is sent by the primary device.

In an implementation, when the primary device is used for the first time, a user can submit the identifier of the primary device and the identity information of the vehicle on which the primary device is located to a server. In a process in which the primary device communicates with the secondary device, the primary device only needs to send the identifier of the primary device to the secondary device, and the secondary device receives the identifier of the primary device and then obtains the identity information of the vehicle on which the primary device is located from the server based on the identifier of the primary device.

Further, after obtaining the identity information of the vehicle, the secondary device can communicate with the server and send the identity information of the vehicle to the server, so that the server can obtain a user account associated with the identity information of the vehicle and then perform an operation such as deducting a fare from the user account, and/or pushing a message to the user account.

In the vehicle identification method, after sending the low-frequency signal, the primary device receives the response signal sent by the secondary device responding to the low-frequency signal, and communicates with the secondary device to cause the secondary device to obtain the identity information of the vehicle on which the primary device is located, so that the vehicle can be identified. The response signal is sent by the secondary device in response to the secondary device receiving the low-frequency signal and detecting that the signal strength of the low-frequency signal is greater than or equal to the predetermined threshold, and the signal strength of the low-frequency signal rapidly attenuates as the distance increases, so that the primary device can determine the distance between the secondary device and the vehicle on which the primary device is located solely based on the received response signal. Therefore, the location of the vehicle on which the primary device is located can be determined accurately, thereby alleviating the interference from vehicles following up and bypassing the vehicle to be identified and improving the accuracy of vehicle identification.

Figure 7:
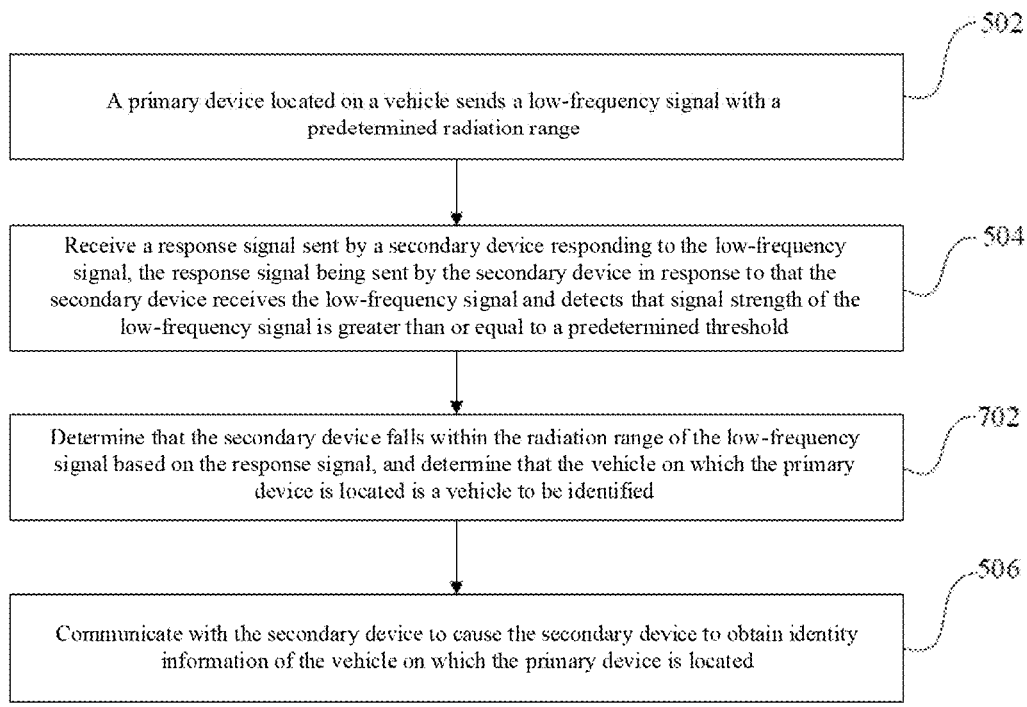
FIG. 7 is a flowchart illustrating another implementation of a vehicle identification method according to the present specification.

FIG. 7 is a flowchart illustrating another implementation of a vehicle identification method according to the present specification. As shown in FIG. 7, in the implementation shown in FIG. 5 in the present specification, before step 506, the method can further include the following step.

Step 702: Determine that the secondary device falls within the radiation range of the low-frequency signal based on the response signal, and determine that the vehicle on which the primary device is located is a vehicle to be identified.

In this implementation, because the radiation range of the low-frequency signal can include the radiation angle and the radiation radius of the low-frequency signal, that the secondary device falls within the radiation range of the low-frequency signal can be that the distance between the secondary device and the primary device is less than or equal to the radiation radius of the low-frequency signal.

For example, when detecting that the signal strength of the low-frequency signal is greater than or equal to the predetermined threshold, the secondary device determines that the secondary device falls within the radiation range of the low-frequency signal, that is, the distance between the secondary device and the primary device is less than or equal to the radiation radius of the low-frequency signal. In this case, the secondary device sends the response signal to the primary device, so that the primary device can determine that the secondary device falls within the radiation range of the low-frequency signal solely based on the received response signal and then can determine that the vehicle on which the primary device is located is the vehicle to be identified. Therefore, the location of the vehicle on which the primary device is located can be determined accurately, thereby alleviating interference from vehicles following and bypassing the vehicle to be identified and improving the accuracy of vehicle identification.

Figure 8:
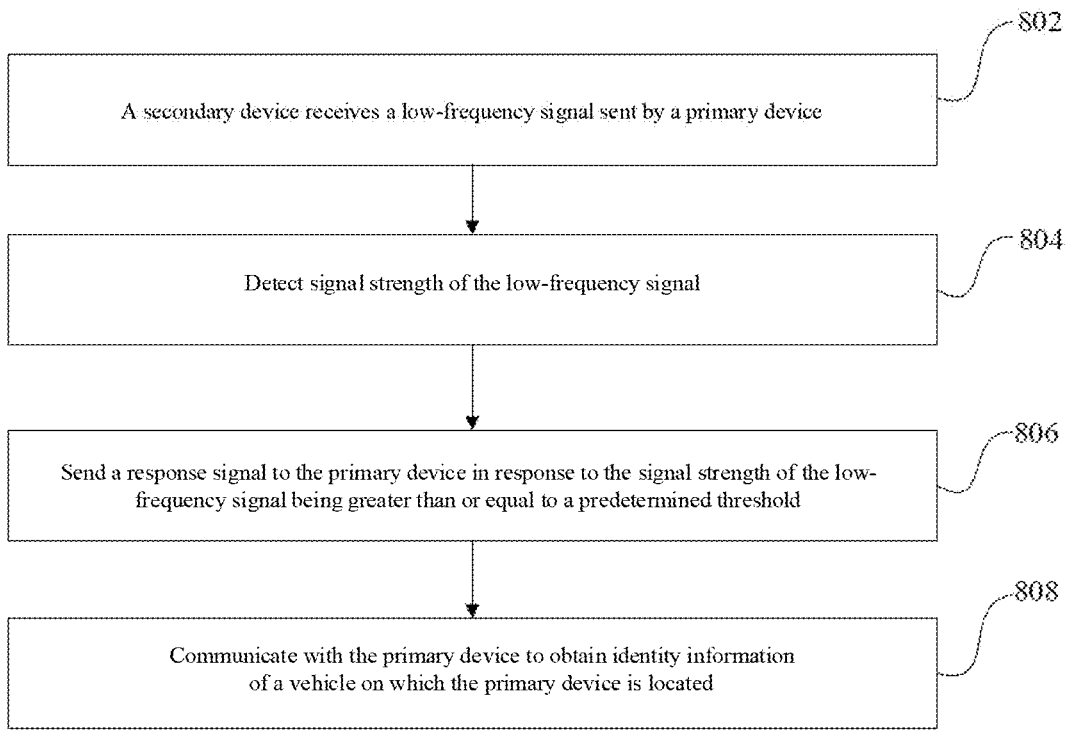
FIG. 8 is a flowchart illustrating another implementation of a vehicle identification method according to the present specification.

FIG. 8 is a flowchart illustrating another implementation of a vehicle identification method according to the present specification. As shown in FIG. 8, the vehicle identification method can include the following steps.

Step 802: A secondary device receives a low-frequency signal sent by a primary device.

The primary device is a device that actively sends the low-frequency signal and corresponds to the secondary device. The secondary device is usually in a sleep state. In this implementation, the primary device can be installed in a vehicle, as shown in FIG. 6. A radiation range of the low-frequency signal sent by the primary device is predetermined. The secondary device can be installed on a certain fixed location on a roadside, and the secondary device can receive the low-frequency signal sent by the primary device after entering the radiation range of the low-frequency signal.

Step 804: Detect signal strength of the low-frequency signal.

Step 806: Send a response signal to the primary device in response to the signal strength of the low-frequency signal being greater than or equal to a predetermined threshold.

In some implementations, the predetermined threshold can be self-determined based on an implementation requirement, system performance, etc. The predetermined threshold is not limited in this implementation.

For example, after receiving the low-frequency signal, the secondary device detects the signal strength of the low-frequency signal. In response to the signal strength of the low-frequency signal being greater than or equal to the predetermined threshold, the secondary device determines that the secondary device falls within the radiation range of the low-frequency signal. In this case, the secondary device sends the response signal to the primary device, so that the primary device can determine the distance between the secondary device and the vehicle on which the primary device is located is less than or equal to the radiation radius of the low-frequency signal solely based on the received response signal. Therefore, the vehicle on which the primary device is located can be positioned accurately, thereby alleviating interference from vehicles following and bypassing the vehicle to be identified.

Step 808: Communicate with the primary device to obtain identity information of the vehicle on which the primary device is located.

In this implementation, the identity information of the vehicle can include one or a combination of a vehicle license plate number, an engine number, and a frame number. Certainly, the identity information of the vehicle can further include other information that can uniquely identify the vehicle. Specific information included in the identity information of the vehicle is not limited in this implementation.

For example, the communicating with the primary device to obtain the identity information of the vehicle on which the primary device is located can be: communicating with the primary device to receive the identity information of the vehicle on which the primary device is located that is sent by the primary device; or communicating with the primary device to receive an identifier of the primary device that is sent by the primary device, to cause the secondary device to obtain the identity information of the vehicle on which the primary device is located based on the identifier of the primary device.

In the vehicle identification method, after receiving the low-frequency signal sent by the primary device, the secondary device detects the signal strength of the low-frequency signal. In response to the signal strength of the low-frequency signal being greater than or equal to the predetermined threshold, the secondary device sends the response signal to the primary device, and communicates with the primary device to obtain the identity information of the vehicle on which the primary device is located, so that the vehicle can be identified. In addition, the primary device can determine that the distance between the secondary device and the vehicle on which the primary device is located is less than or equal to the radiation radius of the low-frequency signal based on the response signal, thereby alleviating interference from vehicles following and bypassing the vehicle to be identified and improving the accuracy of vehicle identification.

FIG. 2 and FIG. 6 in the present specification provide two types of installation locations of a primary device and a secondary device. Alternatively, the methods in FIG. 2 and FIG. 6 can be combined, that is, both a primary device and a secondary device are disposed at fixed locations on a roadside and both a primary device and a secondary device are disposed in a vehicle.

In the vehicle identification method provided in the implementations of the present specification, a principle that magnetic field strength rapidly attenuates as the distance increases is mainly used, and signal strength of a magnetic field signal can approach 0 outside 3 m. Therefore, the location of a vehicle can be determined based on signal strength of a low-frequency signal. However, for ETC and Bluetooth cards, signal strength attenuates very slightly within a short distance (for example, 10 m), and therefore, the location of a vehicle cannot be determined based on signal strength.

The vehicle identification method provided in the implementations of the present specification has relatively low implementation costs and relatively high accuracy of determining the location of a vehicle (at a centimeter level), thereby alleviating interference from vehicles following and bypassing the vehicle to be identified and improving the accuracy of vehicle identification.

The above describes the example implementations of the present specification. Other implementations fall within the scope of the appended claims. In some cases, the actions or steps described in the claims can be performed based on sequences different from the sequences in the implementations and can still achieve the desired results. In addition, the process depicted in the accompanying drawing does not necessarily require the shown particular order or sequence to achieve the desired results. In some implementations, multitask processing and parallel processing are allowed or may be advantageous.

Figure 9:
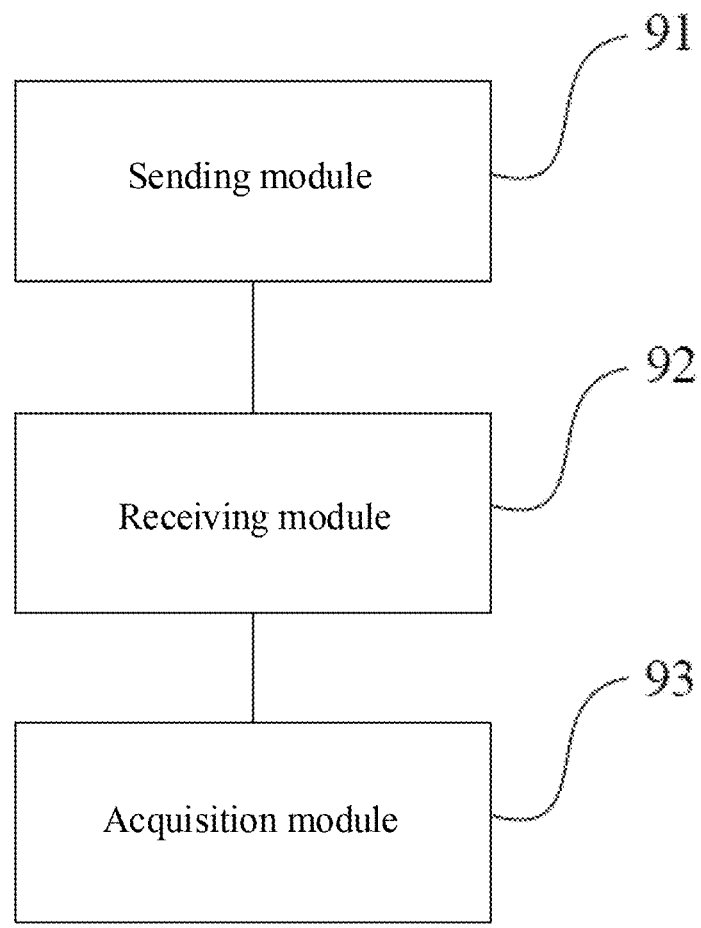
FIG. 9 is a schematic structural diagram illustrating an implementation of a vehicle identification apparatus according to the present specification.

FIG. 9 is a schematic structural diagram illustrating an implementation of a vehicle identification apparatus according to the present specification. As shown in FIG. 9, the vehicle identification apparatus can include a sending module 91, a receiving module 92, and an acquisition module 93.

The sending module 91 is configured to send a low-frequency signal with a predetermined radiation range.

The receiving module 92 is configured to receive a response signal sent by a secondary device located on a vehicle responding to the low-frequency signal, the response signal being sent by the secondary device in response to the secondary device receiving the low-frequency signal and detecting that signal strength of the low-frequency signal is greater than or equal to a predetermined threshold.

The acquisition module 93 is configured to communicate with the secondary device to obtain identity information of the vehicle on which the secondary device is located. In this implementation, the acquisition module 93 is configured to communicate with the secondary device to receive the identity information of the vehicle on which the secondary device is located that is sent by the secondary device; or communicate with the secondary device to receive an identifier of the secondary device that is sent by the secondary device, and obtain the identity information of the vehicle on which the secondary device is located based on the identifier of the secondary device.

The vehicle identification apparatus provided in the implementation shown in FIG. 9 is configured to perform the technical solutions of the method implementation shown in FIG. 1 in the present specification. For the implementation principle and technical effect of the apparatus, references can be further made to related descriptions in the method implementation.

Figure 10:
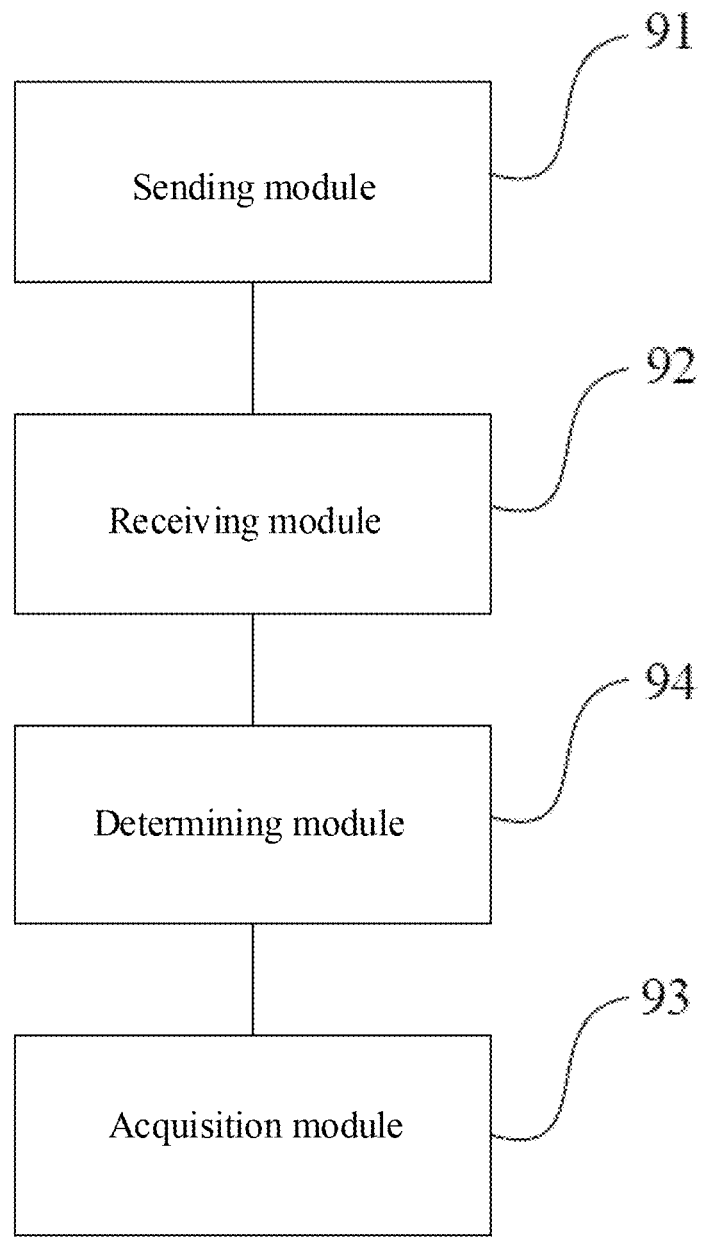
FIG. 10 is a schematic structural diagram illustrating another implementation of a vehicle identification apparatus according to the present specification.

FIG. 10 is a schematic structural diagram illustrating another implementation of a vehicle identification apparatus according to the present specification. Compared with the vehicle identification apparatus shown in FIG. 9, the vehicle identification apparatus shown in FIG. 10 can further include a determining module 94.

The determining module 94 is configured to: before the acquisition module 93 obtains the identity information of the vehicle on which the secondary device is located, determine whether the secondary device falls within the radiation range of the low-frequency signal based on the response signal, and determine whether the vehicle on which the secondary device is located is a vehicle to be identified.

The vehicle identification apparatus provided in the implementation shown in FIG. 10 is configured to perform the technical solutions of the method implementations shown in FIG. 1 to FIG. 3 in the present specification. For an implementation principle and a technical effect of the apparatus, references can be further made to related descriptions in the method implementations.

Figure 11:
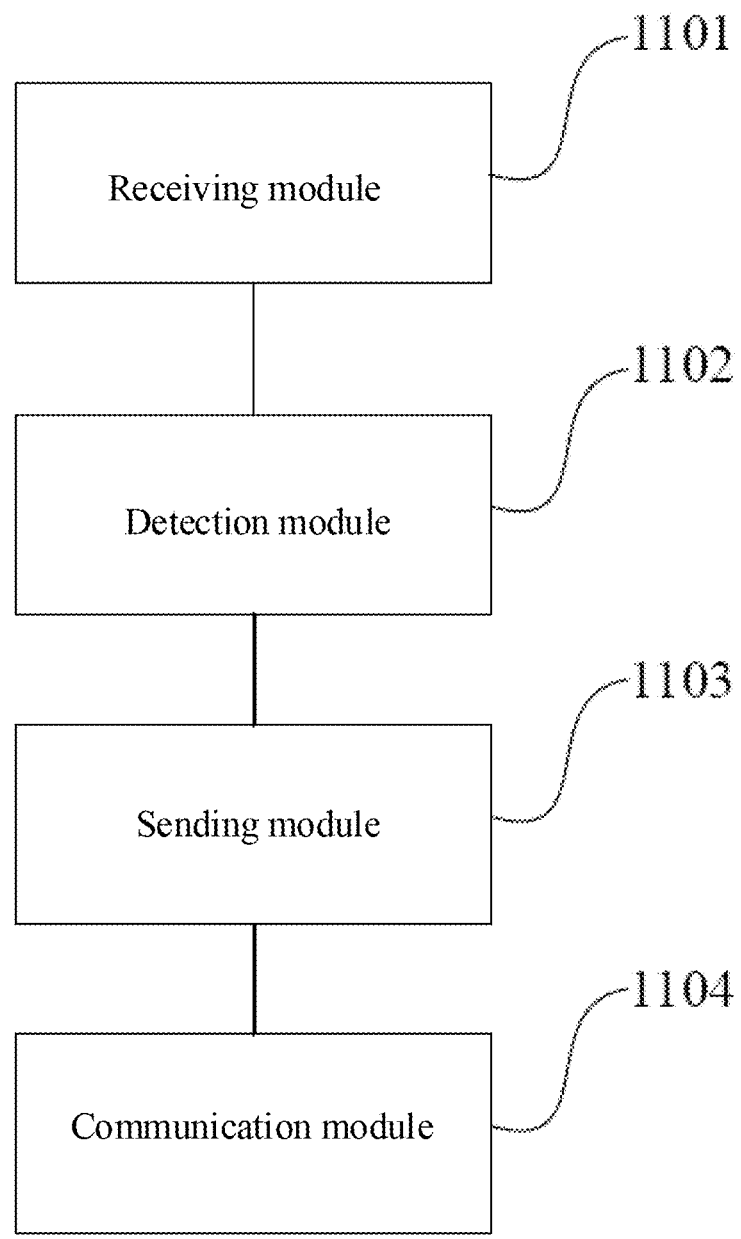
FIG. 11 is a schematic structural diagram illustrating another implementation of a vehicle identification apparatus according to the present specification.

FIG. 11 is a schematic structural diagram illustrating another implementation of a vehicle identification apparatus according to the present specification. As shown in FIG. 11, the vehicle identification apparatus can include a receiving module 1101, a detection module 1102, a sending module 1103, and a communication module 1104.

The receiving module 1101 is configured to receive a low-frequency signal sent by a primary device.

The detection module 1102 is configured to detect signal strength of the low-frequency signal.

The sending module 1103 is configured to send a response signal to the primary device in response to the signal strength of the low-frequency signal being greater than or equal to a predetermined threshold.

The communication module 1104 is configured to communicate with the primary device to cause the primary device to obtain identity information of a vehicle on which the secondary device is located.

The vehicle identification apparatus provided in the implementation shown in FIG. 11 is configured to perform the technical solutions of the method implementation shown in FIG. 4 in the present specification. For an implementation principle and a technical effect of the apparatus, references can be further made to related descriptions in the method implementation.

Figure 12:
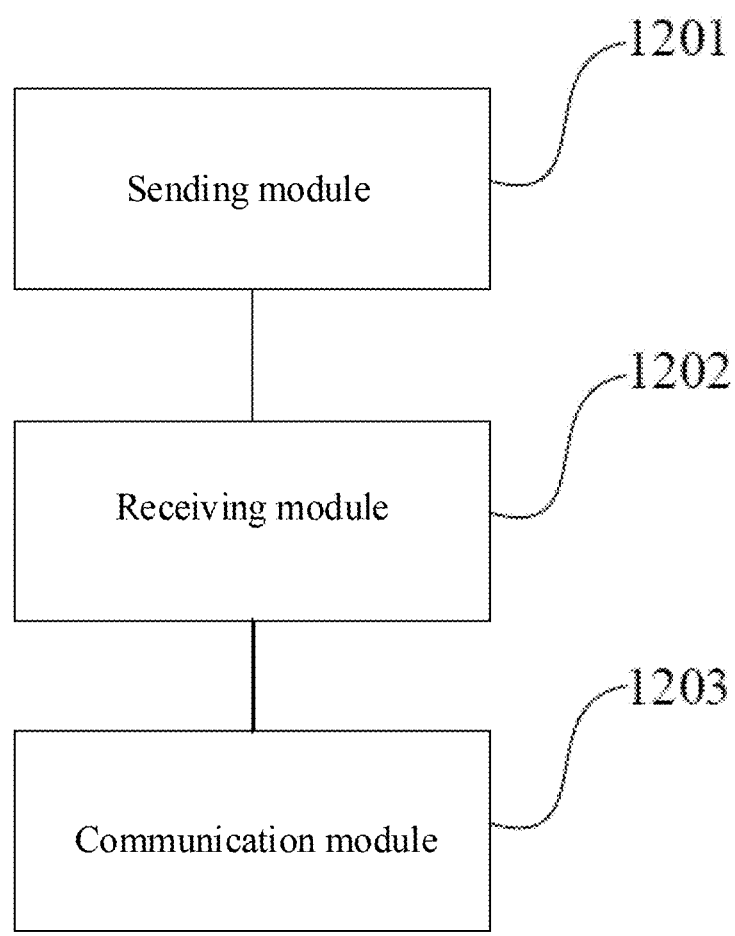
FIG. 12 is a schematic structural diagram illustrating another implementation of a vehicle identification apparatus according to the present specification.

FIG. 12 is a schematic structural diagram illustrating another implementation of a vehicle identification apparatus according to the present specification. As shown in FIG. 12, the vehicle identification apparatus can include a sending module 1201, a receiving module 1202, and a communication module 1203.

The sending module 1201 is configured to send a low-frequency signal with a predetermined radiation range.

The receiving module 1202 is configured to receive a response signal sent by a secondary device responding to the low-frequency signal, the response signal being sent by the secondary device in response to the secondary device receiving the low-frequency signal and detecting that signal strength of the low-frequency signal is greater than or equal to a predetermined threshold.

The communication module 1203 is configured to communicate with the secondary device to cause the secondary device to obtain identity information of a vehicle on which the primary device is located. In this implementation, the communication module 1203 is configured to communicate with the secondary device to send the identity information of the vehicle on which the primary device is located to the secondary device; or communicate with the secondary device to send an identifier of the primary device to the secondary device, to cause the secondary device to obtain the identity information of the vehicle on which the primary device is located based on the identifier of the primary device.

The vehicle identification apparatus provided in the implementation shown in FIG. 12 is configured to perform the technical solutions of the method implementation shown in FIG. 5 in the present specification. For an implementation principle and a technical effect of the apparatus, references can be further made to related descriptions in the method implementation.

Figure 13:
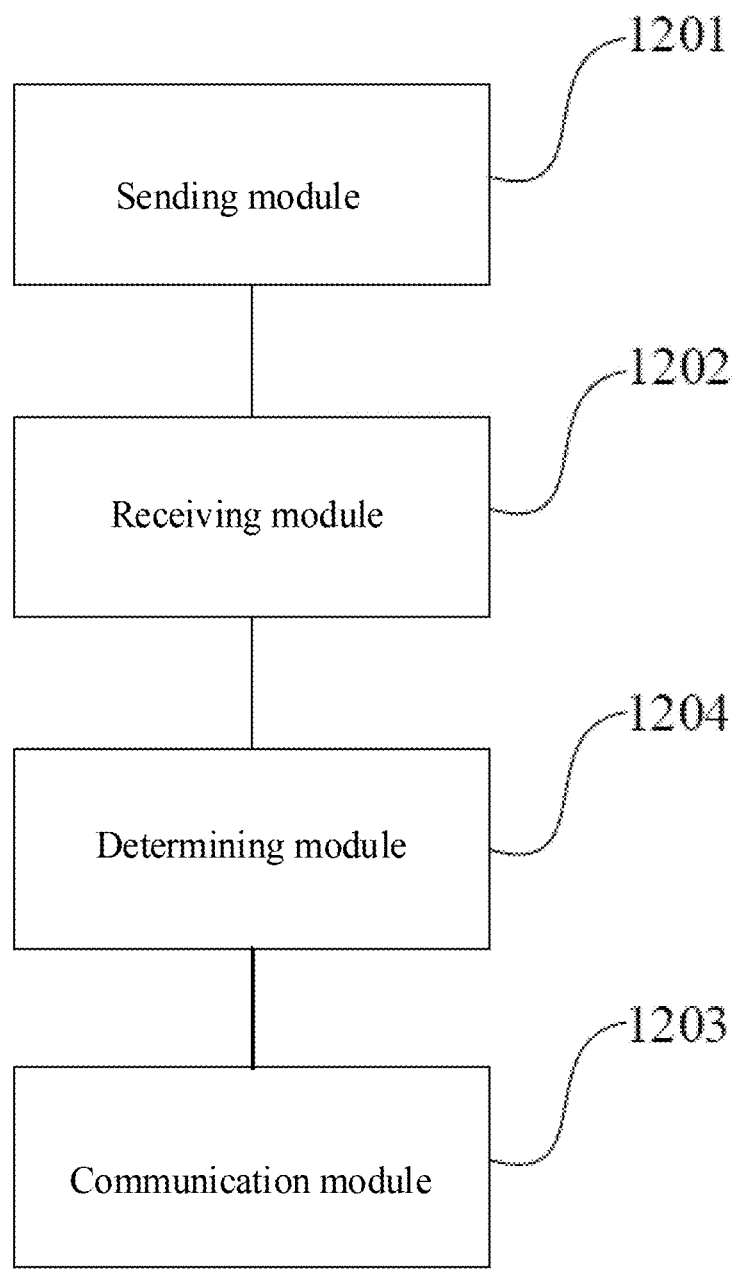
FIG. 13 is a schematic structural diagram illustrating another implementation of a vehicle identification apparatus according to the present specification.

FIG. 13 is a schematic structural diagram illustrating another implementation of a vehicle identification apparatus according to the present specification. Compared with the vehicle identification apparatus shown in FIG. 12, the vehicle identification apparatus shown in FIG. 13 can further include a determining module 1204.

The determining module 1204 is configured to: before the communication module 1203 communicates with the secondary device, determine whether the secondary device falls within the radiation range of the low-frequency signal based on the response signal, and determine whether the vehicle on which the primary device is located is a vehicle to be identified.

The vehicle identification apparatus provided in the implementation shown in FIG. 13 is configured to perform the technical solutions of the method implementations shown in FIG. 5 to FIG. 7 in the present specification. For the implementation principle and technical effect of the apparatus, references can be further made to related descriptions in the method implementations.

Figure 14:
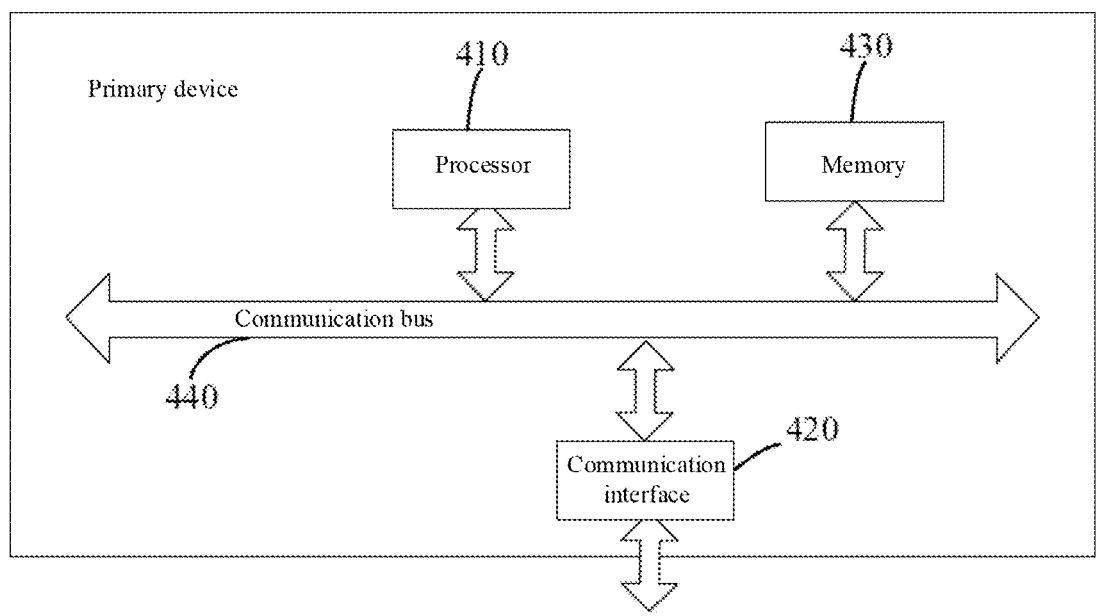
FIG. 14 is a schematic structural diagram illustrating an implementation of a primary device according to the present specification.

FIG. 14 is a schematic structural diagram illustrating an implementation of a primary device according to the present specification. As shown in FIG. 14, the primary device can include at least one processor; and at least one memory communicatively connected to the processor. The memory stores program instructions executable by the processor, and invocable by the processor to perform the vehicle identification methods provided in the implementations shown in FIG. 1 to FIG. 3 in the present specification.

The primary device can be a device that actively sends a low-frequency signal. The specific form of the primary device is not limited in this implementation.

FIG. 14 is a block diagram illustrating an example primary device adapted to implement the implementations of the present specification. The primary device shown in FIG. 14 is only an example, and should not constitute any limitation on the functions and use scope of the implementations of the present specification.

As shown in FIG. 14, the primary device is represented as a common computing device. Components of the primary device can include but are not limited to one or more processors 410, a communication interface 420, a memory 430, and a communication bus 440 connecting different components (including the memory 430, the communication interface 420, and the processing unit 410).

The communication bus 440 represents one or more of several types of bus structures, including a memory bus or a memory controller, a peripheral bus, a graphics acceleration port, or a local bus that uses any one of multiple bus structures. For example, the communication bus 440 can include but is not limited to an industry standard architecture (ISA) bus, a micro channel architecture (MCA) bus, an enhanced ISA bus, a video electronics standards association (VESA) local bus, and a peripheral component interconnection (PCI) bus.

The primary device typically includes multiple computer system readable media. These media can be any available media that can be accessed by the primary device, including volatile and non-volatile media, removable and non-removable media.

The memory 430 can include a computer system readable medium in a form of a volatile memory, such as a random access memory (RAM) and/or a cache memory. The memory 430 can include at least one program product. The program product has a group of program modules (for example, at least one program module) configured to perform the functions of the implementations shown in FIG. 1 to FIG. 3 in the present specification.

A program/utility tool having a group of program modules (at least one program module) can be stored in the memory 430. The program module includes but is not limited to an operating system, one or more application programs, other program modules, and program data. Any one or a certain combination of these examples may include an implementation of a network environment. The program module usually performs the functions and/or methods in the implementations described in FIG. 1 to FIG. 3 in the present specification.

The processor 410 runs the program stored in the memory 430, to perform various functional applications and data processing, for example, implement the vehicle identification methods provided in the implementations shown in FIG. 1 to FIG. 3 in the present specification.

The implementations of the present specification further provide a secondary device, including: at least one processor; and at least one memory communicatively connected to the processor. The memory stores program instructions executable by the processor, and invocable by the processor to perform the vehicle identification method provided in the implementation shown in FIG. 4 in the present specification.

The secondary device corresponds to a primary device, is usually in a sleep state, and makes a response after receiving a low-frequency signal. For example the secondary device can be implemented by using the structure shown in FIG. 14. Details are omitted herein for simplicity.

The implementations of the present specification further provide a primary device, including: at least one processor; and at least one memory communicatively connected to the processor. The memory stores program instructions executable by the processor, and invocable by the processor to perform the vehicle identification methods provided in the implementations shown in FIG. 5 to FIG. 7 in the present specification.

The primary device can be a device that actively sends a low-frequency signal. A specific form of the primary device is not limited in this implementation. For example, the primary device can be implemented by using the structure shown in FIG. 14. Details are omitted herein for simplicity.

The implementations of the present specification provide a non-transient computer-readable storage medium. The non-transient computer-readable storage medium stores computer instructions, and the computer instructions cause the computer to perform the vehicle identification methods provided in the implementations shown in FIG. 1 to FIG. 3 in the present specification.

The implementations of the present specification provide a non-transient computer-readable storage medium. The non-transient computer-readable storage medium stores computer instructions, and the computer instructions cause the computer to perform the vehicle identification method provided in the implementation shown in FIG. 4 in the present specification.

The implementations of the present specification provide a non-transient computer-readable storage medium. The non-transient computer-readable storage medium stores computer instructions, and the computer instructions cause the computer to perform the vehicle identification methods provided in the implementations shown in FIG. 5 to FIG. 7 in the present specification.

The non-transient computer-readable storage medium can be any combination of one or more computer-readable media. The computer-readable media can be computer-readable signal media or computer-readable storage media. For example, the computer-readable storage medium can be but is limited to an electrical, magnetic, optical, electromagnetic, infrared, or semiconductor system, apparatus, or device, or any combination thereof. A more specific example (non-exhaustive list) of the computer-readable storage medium includes an electrical connection having one or more leads, a portable computer disk, a hard disk, a random access memory (RAM), a read-only memory (ROM), an erasable programmable erasable programmable read-only memory (EPROM) or a flash memory, an optical fiber, a portable compact disc read-only memory (CD-ROM), an optical storage device, a magnetic storage device, or any suitable combination thereof. In the present document, the computer-readable storage medium can be any tangible medium that includes or stores a program, and the program can be used by or in combination with an instruction execution system, apparatus, or device.

The computer-readable signal medium can include a data signal propagated in a baseband or as a part of a carrier, and the data signal includes computer-readable program code. The propagated data signal can be in various forms, including but not limited to an electromagnetic signal, an optical signal, or any suitable combination thereof. Alternatively, the computer-readable signal medium can be any computer-readable medium other than the computer-readable storage medium, and the computer-readable medium can send, propagate, or transmit a program used by or in combination with an instruction execution system, apparatus, or device.

Program code included in the computer-readable medium can be transmitted by using any suitable medium, including but not limited to a wireless medium, a wire, an optical cable, a radio frequency (RF) medium, or any suitable combination thereof.

Computer program code used to perform the operations of the present specification can be written in one or more programming languages or a combination thereof. The programming languages include an object-oriented programming language such as Java, Smalltalk, or C++, and also include a conventional procedural programming language such as "C" language or a similar programming language. The program code can be completely executed in a user computer, partially completely in a user computer, executed as an independent software package, partially executed in a user computer and partially executed in a remote computer, or completely executed in a remote computer or server. In a case involving a remote computer, the remote computer can be connected to a user computer via any type of network, including a local area network (LAN) or a wide area network (WAN), or can be connected to an external computer (via, for example, the Internet by using an Internet service provider).

The above describes the example implementations of the present specification. Other implementations fall within the scope of the appended claims. In some cases, the actions or steps described in the claims can be performed based on sequences different from the sequences in the implementations and can still achieve the desired results. In addition, the process depicted in the accompanying drawing does not necessarily require the shown particular order or sequence to achieve the desired results. In some implementations, multi-task processing and parallel processing are allowed or may be advantageous.

In the description of the present specification, descriptions of reference terms such as "an implementation", "some implementations", "an example", "a specific example", and "some examples" mean that specific features, structures, materials, or characteristics described with reference to the implementations or examples are included in at least one implementation or example of the present specification. In the present specification, example expressions of the terms are not necessarily specific to the same implementation or example. In addition, the described specific features, structures, materials, or characteristics can be combined in a proper way in any one or more of the implementations or examples. In addition, a person skilled in the art can integrate or combine different implementations or examples and features of different implementations or examples described in the present specification, provided that they do not conflict with each other.

In addition, the terms "first" and "second" are merely intended for description, and shall not be understood as an indication or implication of relative importance or an implicit indication of the number of indicated technical features. Therefore, a feature limited by "first" or "second" can explicitly or implicitly include at least one such feature. In the description of the present specification, "multiple" means at least two, for example, two or three, unless otherwise specifically limited.

Descriptions about any process or method described in a flowchart or in another way herein can be understood as indicating that one or more modules, segments, or parts of code of an executable instruction used to implement a specific logical function or a step of a process are included, the scope of example implementations of the present specification includes other implementations, and functions can be performed in a sequence other than a shown or discussed sequence, including in a basically simultaneous way or a reverse sequence based on the functions. This should be understood by a person skilled in the technical field to which the implementations of the present specification belong.

Depending on the context, for example, the word "if" used herein can be explained as "while", "when", "in response to determining", or "in response to detection". Similarly, depending on the context, phrases "if determining" or "if detecting (a stated condition or event)" can be explained as "when determining", "in response to determining", "when detecting (the stated condition or event)", or "in response to detecting (the stated condition or event)".

It should be noted that the terminal in the implementations of the present specification can include but is not limited to a personal computer (PC), a personal digital assistant (PDA), a wireless handheld device, a tablet computer (tablet computer), a mobile phone, an MP3 player, an MP4 player, etc.

In the implementations provided in the present specification, it should be understood that the disclosed system, apparatus, and method can be implemented in other ways. For example, the described apparatus implementations are merely examples. For example, the unit division is merely logical function division and can be other division during actual implementation. For example, multiple units or components can be combined or integrated into another system, or some features may be ignored or may not be performed. In addition, the displayed or discussed mutual couplings or direct couplings or communication connections can be implemented by using some interfaces. The indirect couplings or communication connections between the apparatuses or units can be implemented in electronic, mechanical, or other forms.

In addition, functional units in the implementations of the present specification can be integrated into one processing unit, or each of the units can exist alone physically, or two or more units can be integrated into one unit. The integrated unit can be implemented in a form of hardware, or can be implemented in a form of hardware in combination with a software functional unit.

The integrated unit implemented in a form of a software functional unit can be stored in a computer-readable storage medium. The software functional unit is stored in a storage medium and includes several instructions for instructing a computer apparatus (which can be a personal computer, a server, a network apparatus, etc.) or a processor (processor) to perform some of the steps of the methods described in the implementations of the present specification. The storage medium includes any medium that can store program code, such as a USB flash drive, a removable hard disk, a read-only memory (ROM), a random access memory (RAM), a magnetic disk, or an optical disc.

The above descriptions are merely example implementations of the present specification, but are not intended to limit the present specification. Any modification, equivalent replacement, improvement, etc., made without departing from the spirit and principle of the present specification shall fall within the protection scope of the present specification.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle identification method, comprising:
 sending, by a primary device, a low-frequency signal with a determined radiation range having a radiation radius;
 receiving, by a secondary device located on a vehicle, the low-frequency signal;
 detecting, by the secondary device, that signal strength of the low-frequency signal is greater than or equal to a threshold that is determined at least partially based on a determined signal strength of the low-frequency signal within the radiation radius of the determined radiation range;

after having received the low-frequency signal, automatically sending, by the secondary device, a response signal responding to the low-frequency signal based on the detecting that the signal strength of the low-frequency signal is greater than or equal to the threshold;

receiving, by the primary device, the response signal sent by the secondary device;

determining, by the primary device, that the secondary device is within the radiation radius based on the receiving the response signal from the secondary device; and establishing a communication link, by the primary device, with the secondary device to obtain identity information of the vehicle on which the secondary device is located in response to the determining that the secondary device is within the radiation radius based on the receiving the response signal, the identity information different from the response signal.

2. The method according to claim 1, comprising:
before the communicating with the secondary device to obtain the identity information of the vehicle on which the secondary device is located,
determining that the vehicle on which the secondary device is located is a vehicle to be identified.

3. The method according to claim 1, wherein the obtaining the identity information of the vehicle on which the secondary device is located includes:
communicating with the secondary device to receive the identity information of the vehicle on which the secondary device is located; or
communicating with the secondary device to receive an identifier of the secondary device that is sent by the secondary device, and obtain the identity information of the vehicle on which the secondary device is located based on the identifier of the secondary device.

4. The method according to claim 1, comprising:
communicating, by the secondary device, with the primary device to cause the primary device to obtain identity information of the vehicle on which the secondary device is located.

5. The method according to claim 1, wherein the radiation range includes a radiation angle.

6. The method according to claim 1, wherein the determined threshold is determined at least partially based on the radiation angle of the radiation range.

7. The method according to claim 1, wherein the determined threshold is determined based on a signal strength of the low-frequency signal at an edge of the radiation range.

8. A vehicle identification method, comprising:
sending, by a primary device located on a vehicle, a low-frequency signal with a determined radiation range having a radiation radius;
receiving, by a secondary device located outside the vehicle, the low-frequency signal;
detecting, by the secondary device, that signal strength of the low-frequency signal is greater than or equal to a threshold that is determined at least partially based on a determined signal strength of the low-frequency signal within the radiation radius of the determined radiation range;
after having received the low-frequency signal, automatically sending, by the secondary device, a response signal responding to the low-frequency signal based on the detecting that the signal strength of the low-frequency signal is greater than or equal to the threshold;

receiving, by the primary device, the response signal sent by the secondary device;

determining, by the primary device, that the secondary device is within the radiation radius based on the receiving the response signal from the secondary device; and establishing a communication link, by the primary device, with the secondary device to cause the secondary device to obtain identity information of the vehicle on which the primary device is located in response to the determining that the secondary device is within the radiation radius based on the receiving the response signal, the identity information different from the response signal.

9. The method according to claim 8, comprising:
before the communicating with the secondary device to cause the secondary device to obtain the identity information of the vehicle on which the primary device is located,
determining that the vehicle on which the primary device is located is a vehicle to be identified.

10. The method according to claim 8, wherein the causing the secondary device to obtain the identity information of the vehicle on which the primary device is located includes:
communicating with the secondary device to send the identity information of the vehicle to the secondary device; or
communicating with the secondary device to send an identifier of the primary device to the secondary device, to cause the secondary device to obtain the identity information of the vehicle based on the identifier of the primary device.

11. An electronic system, comprising:
one or more processors; and
one or more memories communicatively coupled to the processor, the one or more memories storing executable instructions, which when executed by the one or more processors enable the one or more processors to implement acts including:
sending, by a primary device, a low-frequency signal with a determined radiation range having a radiation radius;
receiving, by a secondary device located on a vehicle, the low-frequency signal;
detecting, by the secondary device, that signal strength of the low-frequency signal is greater than or equal to a threshold that is determined at least partially based on a determined signal strength of the low-frequency signal within the radiation radius of the determined radiation range;
after having received the low-frequency signal, automatically sending, by the secondary device, a response signal responding to the low-frequency signal based on the detecting that the signal strength of the low-frequency signal is greater than or equal to the threshold;
receiving, by the primary device, the response signal sent by the secondary device;
determining, by the primary device, that the secondary device is within the radiation radius based on the receiving the response signal from the secondary device; and
establishing a communication link, by the primary device, with the secondary device to obtain identity information of the vehicle on which the secondary device is located in response to the determining that the secondary device is within the radiation radius based on the receiving the response signal, the identity information different from the response signal.

12. The system according to claim 11, wherein the acts include:
before the communicating with the secondary device to obtain the identity information of the vehicle on which the secondary device is located,
determining that the vehicle on which the secondary device is located is a vehicle to be identified.

13. The system according to claim 11, wherein the obtaining the identity information of the vehicle on which the secondary device is located includes:
communicating with the secondary device to receive the identity information of the vehicle on which the secondary device is located; or
communicating with the secondary device to is sent by the secondary device, and obtain the identity information of the vehicle on which the secondary device is located based on the identifier of the secondary device.

14. The system according to claim 11, wherein the radiation range includes a radiation angle.

15. The system according to claim 11, wherein the determined threshold is determined at least partially based on the radiation angle of the radiation range.

16. The system according to claim 11, wherein the determined threshold is determined based on a signal strength of the low-frequency signal at an edge of the radiation range.

17. An electronic system, comprising:
one or more processors; and
one or more memories communicatively coupled to the processor, the one or more memories storing executable instructions, which when executed by the one or more processors enable the one or more processors to implement acts including:
sending, by a primary device located on a vehicle, a low-frequency signal with a determined radiation range having a radiation radius;
receiving, by a secondary device located outside the vehicle, the low-frequency signal;
detecting, by the secondary device, that signal strength of the low-frequency signal is greater than or equal to a threshold that is determined at least partially based on a determined signal strength of the low-frequency signal within the radiation radius of the determined radiation range;
after having received the low-frequency signal, automatically sending, by the secondary device, a response signal responding to the low-frequency signal based on the detecting that the signal strength of the low-frequency signal is greater than or equal to the threshold;
receiving, by the primary device, the response signal sent by the secondary device;
determining, by the primary device, that the secondary device is within the radiation radius based on the receiving the response signal from the secondary device; and
establishing a communication link, by the primary device, with the secondary device to cause the secondary device to obtain identity information of the vehicle on which the primary device is located in response to determining that the secondary device is within the radiation radius based on the receiving the response signal, the identity information different from the response signal.

18. The system according to claim 17, wherein the acts include:
before the communicating with the secondary device to cause the secondary device to obtain the identity information of the vehicle on which the primary device is located,
determining that the vehicle on which the primary device is located is a vehicle to be identified.

19. The method according to claim 8, wherein the determined threshold is determined based on a signal strength of the low-frequency signal at an edge of the radiation range.

20. The system according to claim 17, wherein the determined threshold is determined based on a signal strength of the low-frequency signal at an edge of the radiation range.

* * * * *